(12) United States Patent
Jeong et al.

(10) Patent No.: US 11,124,660 B2
(45) Date of Patent: Sep. 21, 2021

(54) ANTIMICROBIAL POLYMER COATING COMPOSITION AND ANTIMICROBIAL POLYMER FILM

(71) Applicant: LG CHEM, LTD., Seoul (KR)

(72) Inventors: Hyeok Jeong, Daejeon (KR); Taekeun Kim, Daejeon (KR); Jinkyu Lee, Daejeon (KR); Mingoo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 96 days.

(21) Appl. No.: 16/488,053

(22) PCT Filed: Sep. 20, 2018

(86) PCT No.: PCT/KR2018/011166
§ 371 (c)(1),
(2) Date: Aug. 22, 2019

(87) PCT Pub. No.: WO2019/066392
PCT Pub. Date: Apr. 4, 2019

(65) Prior Publication Data
US 2020/0048476 A1 Feb. 13, 2020

(30) Foreign Application Priority Data

Sep. 27, 2017 (KR) .................. 10-2017-0125447

(51) Int. Cl.
*C08G 77/38* (2006.01)
*C09D 5/14* (2006.01)
(Continued)

(52) U.S. Cl.
CPC .............. *C09D 5/14* (2013.01); *C08G 77/38* (2013.01); *C08J 5/18* (2013.01); *C08K 5/0058* (2013.01);
(Continued)

(58) Field of Classification Search
None
See application file for complete search history.

(56) References Cited

U.S. PATENT DOCUMENTS 5,153,099 A  10/1992 Kishii et al.
5,204,215 A   4/1993 Kishii et al.
(Continued)

FOREIGN PATENT DOCUMENTS

CN   1256395 A    6/2000
JP   H06-107662 A  4/1994
(Continued)

OTHER PUBLICATIONS

Zhang, et al. "Unimolecular micelles from POSS-based star-shaped block copolymers for photodynamic therapy" Polymer 118 (2017): 268-279. (Year: 2017).*

(Continued)

*Primary Examiner* — Robert S Loewe
(74) *Attorney, Agent, or Firm* — Rothwell, Figg, Ernst & Manbeck, P.C.

(57) ABSTRACT

An antimicrobial polymer coating composition comprising a polyhedral oligomeric silsesquioxane having a cage structure and having one or more reactive functional groups substituted on silicon atoms; a thermal initiator; and a photosensitizer, an antimicrobial polymer film comprising a cured product of the antimicrobial polymer coating composition, and an antimicrobial polymer film comprising: a substrate layer containing a polyhedral oligomeric silsesquioxane having a cage structure, in which one or more reactive functional groups are substituted; and a photosensitizes dispersed in the substrate layer, wherein the polymer film has oxygen permeability of 10 to 80 cc/m² day.

14 Claims, 3 Drawing Sheets

(51) Int. Cl.

| | | |
|---|---|---|
| *C09D 7/40* | (2018.01) | |
| *C08J 5/18* | (2006.01) | |
| *C08K 5/00* | (2006.01) | |
| *C08K 5/3415* | (2006.01) | |
| *C08L 63/00* | (2006.01) | |
| *C09D 183/04* | (2006.01) | |

(52) U.S. Cl.
    CPC ............ *C08K 5/3415* (2013.01); *C08L 63/00* (2013.01); *C09D 7/40* (2018.01); *C09D 183/04* (2013.01); *C08L 2203/20* (2013.01); *C08L 2312/00* (2013.01)

(56) References Cited

U.S. PATENT DOCUMENTS

| | | | |
|---|---|---|---|
| 6,571,864 B1 | 6/2003 | Yoon et al. | |
| 6,664,024 B1* | 12/2003 | Nguyen | C08G 59/18 430/280.1 |
| 8,026,293 B2* | 9/2011 | Allen | H01L 21/02203 522/99 |
| 10,351,651 B2* | 7/2019 | Kobayashi | B32B 3/10 |
| 2004/0120915 A1* | 6/2004 | Yang | A61Q 19/00 424/70.13 |
| 2004/0137241 A1* | 7/2004 | Lin | H01L 21/31695 428/447 |
| 2005/0049381 A1* | 3/2005 | Yamahiro | C08G 77/388 528/10 |
| 2006/0094849 A1* | 5/2006 | Toyoda | C07F 7/21 528/34 |
| 2006/0175684 A1* | 8/2006 | Oikawa | C07F 7/21 257/632 |
| 2010/0004202 A1 | 1/2010 | Chisholm et al. | |
| 2012/0252920 A1 | 10/2012 | Macmillan et al. | |
| 2013/0183534 A1* | 7/2013 | Mori | C23C 18/1612 428/447 |
| 2013/0210953 A1* | 8/2013 | Kilway | C08G 77/50 522/36 |
| 2014/0018475 A1* | 1/2014 | Falkner | C08L 63/00 523/458 |
| 2015/0056553 A1* | 2/2015 | Huang | G03F 7/0757 430/280.1 |
| 2016/0159989 A1 | 6/2016 | Kang et al. | |
| 2017/0227846 A1* | 8/2017 | Zheng | G03F 7/40 |
| 2019/0322811 A1* | 10/2019 | Xie | C08G 77/458 |

FOREIGN PATENT DOCUMENTS

| | | |
|---|---|---|
| JP | 2701230 B2 | 1/1998 |
| JP | 2009-042351 A | 2/2009 |
| JP | 2011-515513 A | 5/2011 |
| JP | 2017-008146 A | 1/2017 |
| KR | 10-2012-0105502 A | 9/2012 |
| KR | 10-2014-0080863 A | 7/2014 |
| KR | 10-1465964 B1 | 11/2014 |
| KR | 10-2015-0000789 A | 1/2015 |
| KR | 10-2016-0053083 A | 5/2016 |
| KR | 10-1643295 B1 | 7/2016 |
| KR | 10-2017-0040411 A | 4/2017 |
| KR | 10-2017-0139327 A | 12/2017 |
| WO | 2009-110848 A1 | 9/2009 |

OTHER PUBLICATIONS

Alvarez et al. "Photodynamic inactivation of Candida albicans using bridged polysilsesquioxane films doped with porphyrin" Bioorganic & medicinal chemistry 20, No. 13 (2012): 4032-4039. (Year: 2012).*

Cho et al. "UV-initiated free radical and cationic photopolymerizations of acrylate/epoxide and acrylate/vinyl ether hybrid systems with and without photosensitizer" Journal of Applied Polymer Science 93, No. 3 (2004): 1473-1483. (Year: 2004).*

Pyun et al. "The synthesis of hybrid polymers using atom transfer radical polymerization: homopolymers and block copolymers from polyhedral oligomeric silsesquioxane monomers" Macromolecules 33, No. 1 (2000): 217-220. (Year: 2000).*

Alvarez, et al., "Photodynamic inactivation of Candida albicans using bridged polysilsesquioxane films doped with porphyrin", Bioorganic & Medicinal Chemistry, vol. 20, No. 13, May 8, 2012, pp. 4032-4039.

Extended European Search Report issued in the corresponding European Patent Application No. 18862625.3 on Feb. 5, 2020, 7 pages.

PCT Search Report & Written Opinion issued for PCT Application No. PCT/KR2018/011166 dated Jan. 8, 2019, 13 pages.

Ismail et al., "Efficacy of a Novel Light-Activated Antimicrobial Coating for Disinfecting Hospital Surfaces", Infection Control and Hospital Epidemiology, 2011, vol. 32, No. 11, pp. 1130-1132.

Wang, et al., "Bactericidal effect through non-uptake pathway with photofunctional silicon polymer that generates reactive oxygen species", Journal of Photochemistry and Photobiology A. Chemistry 315, 2016, 52-58.

* cited by examiner

[FIG. 1]
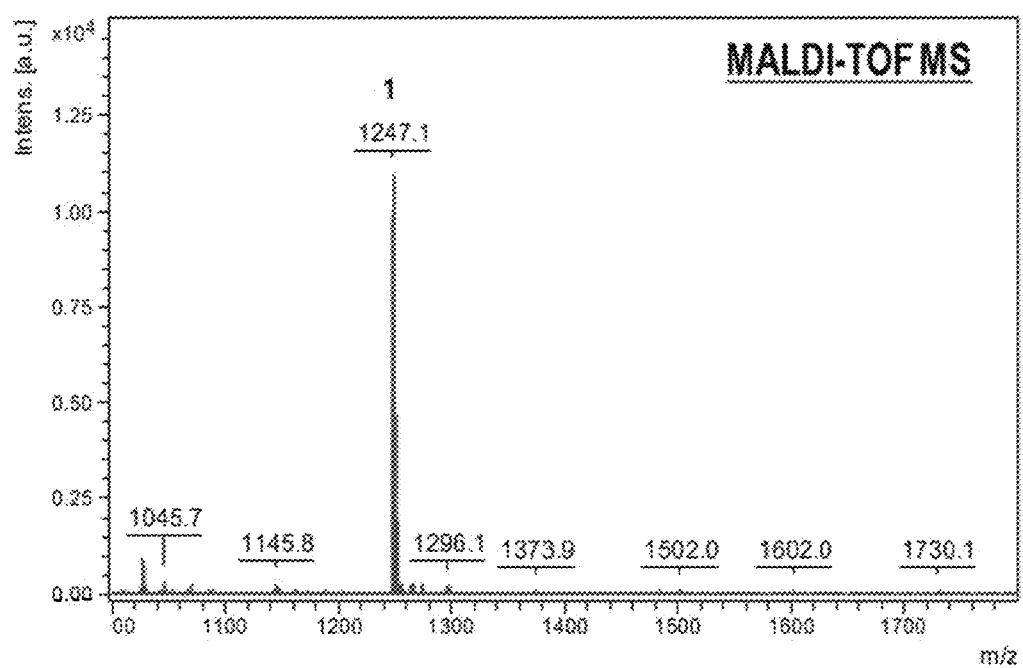

[FIG. 2]
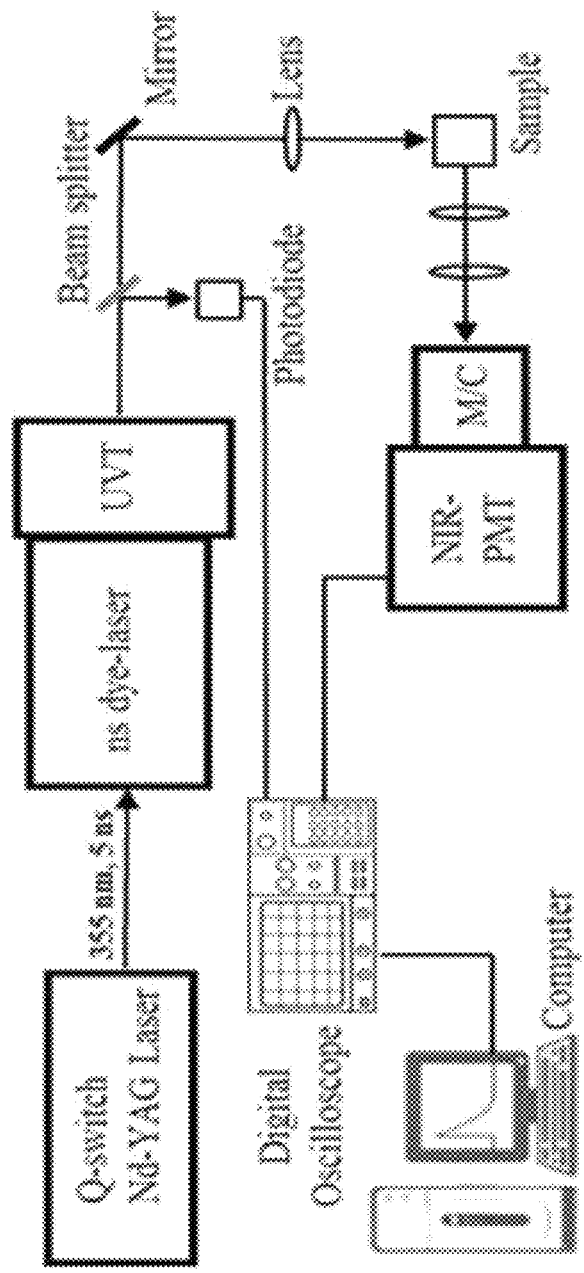

[FIG. 3]
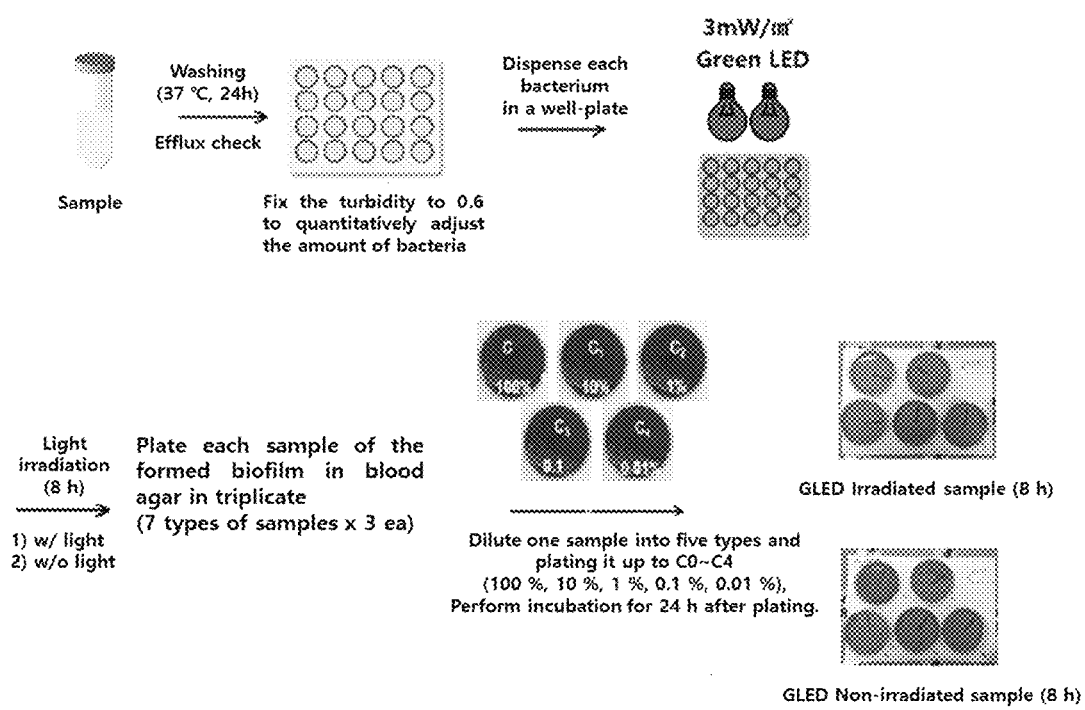
[FIG. 4]
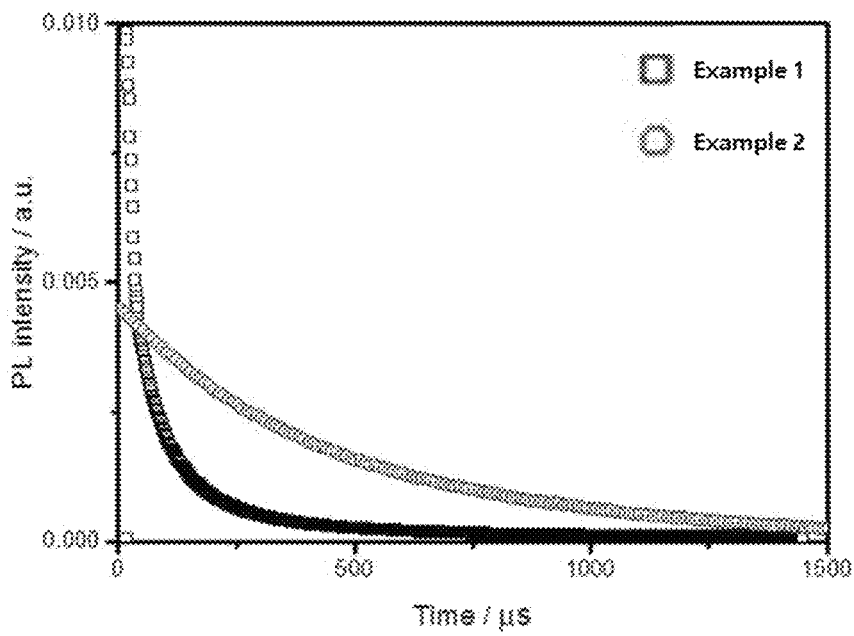

_US 11,124,660 B2_

ANTIMICROBIAL POLYMER COATING COMPOSITION AND ANTIMICROBIAL POLYMER FILM

CROSS-REFERENCE TO RELATED APPLICATION(S)

This application is a 35 U.S.C. § 371 National Phase Entry Application from PCT/KR2018/011166, filed on Sep. 20, 2018, and designating the United States, which claims the benefit of filing date of Korean Patent Application No. 10-2017-0125447 filed with the Korean Intellectual Property Office on Sep. 27, 2017, the entire content of which is incorporated herein by reference.

TECHNICAL FIELD

The present invention relates to an antimicrobial polymer coating composition and an antimicrobial polymer film.

BACKGROUND ART

A photosensitizer absorbs light to produce reactive oxygen species (ROS), and a photodynamic therapy (PDT) is widely used in which the photosensitizer is excited upon irradiation with light of a specific wavelength from the outside to generate active oxygen species or free radicals, thereby inducing apoptosis of various lesions or cancer cells and destroying them.

Various attempts have been made to develop polymeric materials having antimicrobial activity using such photodynamic reaction. For example, a method of melting a silicone resin or the like and then mixing the melted resin with a photosensitizer, or a method of using a coating solution formed by dissolving a silicone resin and a photosensitizer in a solvent are known.

However, according to the method of melting a silicone resin or the like and mixing it with a photosensitizer, since the dispersibility between the photosensitizer and the silicone resin is low, the photosensitizer in the silicone resin can be aggregated without being homogeneously distributed.

In addition, when melted with the silicone resin, since it is impossible to adjust the thickness of the silicone after melting, there is a limitation in that it is not easy to produce products in accordance with the application fields and uses or it is not suitable for mass production.

Moreover, when a coating solution formed by dissolving a silicone resin and a photosensitizer in a solvent is used, it is known that a certain level of antimicrobial activity can be achieved without being severely limited in the field of application. However, it is not easy to produce active oxygen to such an extent that sufficient antimicrobial activity can be exhibited when light in the visible light region is used, and the produced active oxygen is present only for a very short period of time. Thus, there is a limitation in that an excessive amount of light energy must be irradiated for a relatively long period of time.

DETAILED DESCRIPTION OF THE INVENTION

Technical Problem

The present invention provides an antimicrobial coating composition which can maintain high antimicrobial activity for a long period of time even when using light in a visible light region, and can provide an antimicrobial material suitable for a mass production process.

The present invention also provides an antimicrobial coating film which can maintain high antimicrobial activity for a long period of time even when using light in a visible light region.

Technical Solution

The present invention provides an antimicrobial polymer coating composition comprising: a polyhedral oligomeric silsesquioxane having a cage structure, in which one or more reactive functional groups are substituted; a thermal initiator; and a photosensitizer.

The present invention also provides an antimicrobial polymer film comprising a cured product of the antimicrobial polymer coating composition.

In addition, the present invention provides an antimicrobial polymer film comprising a substrate layer containing a polyhedral oligomeric silsesquioxane having a cage structure, in which one or more reactive functional groups are substituted, and a photosensitizer dispersed in the substrate layer, wherein the polymer film has oxygen permeability of 10 to 80 cc/m$^2$ day.

Hereinafter, the antimicrobial polymer coating composition and the antimicrobial polymer film according to a specific embodiment of the present invention will be described in more detail In the present invention, the term "(meth)acrylate" is used with the meaning of including acrylate or methacrylate.

According to one embodiment of the invention, an antimicrobial polymer coating composition can be provided, comprising: a polyhedral oligomeric silsesquioxane having a cage structure, in which one or more reactive functional groups are substituted; a thermal initiator; and a photosensitizer.

The present inventors conducted research on materials having a functional property such as antimicrobial activity using a photosensitizer, and found through experiments that a polymer coating composition produced by mixing a polyhedral oligomeric silsesquioxane having a cage structure, in which one or more reactive functional groups are substituted, with a photosensitizer, is not only easily applicable to various fields and is suitable for mass production, but can also realize high antimicrobial activity even when applying light in a visible light region during production of an actual coating film or a coated molded article, and particularly, the generated active oxygen remains for a long time compared to previously known antimicrobial materials and thus can achieve high antimicrobial efficiency. The present invention has been completed on the basis of such findings.

More specifically, a predetermined polymer structure may be formed inside a polymer film or a polymer molded article produced using a polyhedral oligomeric silsesquioxane having a cage structure, in which one or more reactive functional groups are substituted. In particular, it is possible to provide an internal space in which the photosensitizer can for a long time.

In addition, the polymer film or the polymer molded article may have specific air permeability, for example, oxygen permeability of 10 to 80 cc/m$^2$ day, 20 to 70 cc/cc/m$^2$ day, or 25 to 60 cc/cc/m$^2$ day.

When light in a visible light region is irradiated to such a polymer film or a polymer molded article, active oxygen species or free radicals are generated from the photosensitizer contained in the polymer film or the polymer molded article. As described above, the active oxygen derived from the photosensitizer can be maintained for a longer period of time in the space formed by the polyhedral oligomeric silsesquioxane having a cage structure, in which one or more reactive functional groups are substituted. In addition, as the polymer film or the polymer molded article has oxygen permeability in the above-described range, the active oxygen can be generated more efficiently, and also the time in which the active oxygen remains can be greatly increased.

Meanwhile, as the antimicrobial polymer coating composition includes a polyhedral oligomeric silsesquioxane having a cage structure, in which one or more reactive functional groups are substituted, it is possible to enhance the mechanical properties such as surface hardness and scratch resistance of a coating film or a binder resin which is formed at the time of curing the antimicrobial polymer coating composition.

More specific examples of the reactive functional group substituted in the polyhedral oligomeric silsesquioxane having a cage structure include a (meth)acrylate, an alkyl(meth)acrylate having 1 to 20 carbon atoms, a cycloalkyl epoxide having 3 to 20 carbon atoms, an alkyl cycloalkane epoxide having 1 to 10 carbon atoms, a dialkylsilane epoxide, and the like.

Such a reactive functional group can be substituted in the polyhedral oligomeric silsesquioxane having a cage structure via a direct bond, sulfur, or oxygen.

On the other hand, at least one of the silicon atoms of the polyhedral oligomeric silsesquioxane having the cage structure is substituted with a reactive functional group, and the remaining silicon atoms not substituted with a reactive functional group may be unsubstituted or substituted with a non-reactive functional group.

As the reactive functional group is substituted in at least one of the silicon atoms of the polyhedral oligomeric silsesquioxane having the cage structure, it is possible to enhance the mechanical properties of a coating film or a binder resin which is formed at the time of curing the antimicrobial polymer coating composition. In addition, as the non-reactive functional group is substituted in the remaining silicon atoms, steric hindrance occurs in the molecular structure and the frequency or probability of exposing the siloxane bond (—Si—O—) to the outside is greatly lowered so that compatibility with other materials may be higher. As the siloxane bond is tightly bonded between the reactive functional groups and other organic materials, it is prevented from being separated by external pressure, and can act as a solid support in the coating film or binder resin formed upon curing of the antimicrobial polymer coating composition. As a result, the strength and scratch resistance of a finally manufactured product can be greatly increased.

More specifically, 4% to 60%, 5% to 55%, or 20% to 40% of the silicon atoms of the polyhedral oligomeric silsesquioxane having the cage structure may be substituted with a reactive functional group.

When the rate at which the reactive functional group is substituted in the silicon atoms of the polyhedral oligomeric silsesquioxane having the cage structure is too small, active oxygen may be generated at a certain level during visible light irradiation, but the film strength of the polymer film is lowered so that a slight amount of the supported photosensitizer may leak out of the film, and a secondary side reaction to the leaked photosensitizer (for example, harmful effects on the human body due to the photosensitizer, environmental pollution, etc.) may occur. In addition, since the polymer film has low hardness, it may be difficult to apply to a plurality of application products.

In addition, when the rate at which the reactive functional group is substituted in the silicon atoms of the polyhedral oligomeric silsesquioxane having the cage structure is too large, the hardness of the polymer film formed from the antimicrobial polymer coating composition becomes excessively high, the oxygen permeability is sharply decreased, and the production rate of singlet oxygen can be sharply reduced. As a result, the antimicrobial activity can be extremely lowered, and also active oxygen is not sufficiently generated during visible light irradiation, and antimicrobial activity is not realized, so that it may be difficult to apply to a plurality of application products.

Examples of the polyhedral oligomeric silsesquioxane (POSS) having a cage structure in which at least one reactive functional group is substituted include: POSS in which at least one alcohol is substituted, such as TMP diolisobutyl POSS, cyclohexanediol isobutyl POSS, 1,2-propanediollsobutyl POSS, octa(3-hydroxy-3 methylbutyldimethylsiloxy) POSS, etc.; POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS in which at least one carboxylic acid is substituted, such as maleamic acid-cyclohexyl POSS, maleamic acid-isobutyl POSS, octamaleamic acid POSS, etc; POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, octaoxiranyldimethylsilyl POSS, etc.; POSS in which at least one imide is substituted, such as POSS maleimide cyclohexyl, POSS maleimide isobutyl, etc.; POSS in which at least one (meth)acrylate is substituted, such as acryloisobutyl POSS,(meth)acrylisobutyl POSS,(meth)acrylate cyclohexyl POSS,(meth)acrylate isobutyl POSS,(meth)acrylate ethyl POSS,(meth)acrylethyl POSS,(meth)acrylate isooctyl POSS,(meth)acrylisooctyl POSS,(meth)acrylphenyl POSS,(meth)acryl POSS, acrylo POSS, etc.; POSS in which at least one nitrile group is substituted, such as cyanopropylisobutyl POSS, etc.; POSS in which at least one norbornene is substituted, such as norbornenylethylethyl POSS, norbornenylethylisobutyl POSS, norbornenylethyl disilanoisobutyl POSS, trisnorbornenylisobutyl POSS, etc.; POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; POSS in which at least one olefin is substituted, such as allylisobutyl POSS, monovinylisobutyl POSS, octacyclohexenyldimethylsilyl POSS, octavinyldimethylsilyl POSS, octavinyl POSS, etc.; POSS in which a PEG having 5 to 30 carbon atoms is substituted; or POSS in which at least one thiol group is substituted, such as mercaptopropylisobutyl POSS, mercaptopropylisooctyl POSS, etc.

Meanwhile, the antimicrobial polymer coating composition may further include a thermosetting resin containing at least one thermosetting functional group selected from the group consisting of an epoxy group, an oxetanyl group, a cyclic ether group, and a cyclic thioether group.

The thermosetting resin may have a weight average molecular weight of 500 g/mol to 500,000 g/mol, or 1,000 g/mol to 100,000 g/mol, in consideration of the specific use and physical properties of the antimicrobial coating composition.

As used herein, the weight average molecular weight means a weight average molecular weight in terms of polystyrene measured by the GPC method.

As the thermosetting resin, a commonly known thermosetting binder or the like can be used.

For example, as the thermosetting resin, a resin having two or more cyclic ether groups and/or cyclic thioether groups (hereinafter referred to as "cyclic (thio)ether group") in the molecule can be used, and a bifunctional epoxy resin may be used.

Another diisocyanate or its bifunctional block isocyanate may also be used.

The thermosetting binder having two or more cyclic (thio)ether groups in the molecule may be a compound having one or two groups selected among 3, 4, or 5-membered cyclic ether groups or 3, 4, or 5-membered cyclic thioether groups in the molecule.

Further, the thermosetting binder may be a multifunctional epoxy resin having at least two epoxy groups in the molecule, a multifunctional oxetane resin having at least two oxetanyl groups in the molecule, an episulfide resin having at least two thioether groups in the molecule, or the like.

Specific examples of the multifunctional epoxy resin include a bisphenol A epoxy resin, a hydrogenated bisphenol A epoxy resin, a brominated bisphenol A epoxy resin, a bisphenol F epoxy resin, a bisphenol S epoxy resin, a novolac epoxy resin, a phenol novolac epoxy resin, a cresol novolac epoxy resin, an N-glycidyl epoxy resin, a novolac epoxy resin of bisphenol A, a bixylenol epoxy resin, is biphenol epoxy resin, a chelate epoxy resin, a glyoxal epoxy resin, an amino group-containing epoxy resin, a rubber modified epoxy resin, a dicyclopentadiene phenolic epoxy resin, a diglycidylphthalate resin, a heterocyclic epoxy resin, a tetraglycidyl xylenoyl ethane resin, a silicone modified epoxy resin, and an ε-caprolactone modified epoxy resin.

Further, in order to impart a flame retardant property, those in which an element such as phosphorus is introduced in its structure may be used.

These epoxy resins are subjected to thermal curing, thereby improving the properties such as adhesion of the cured film, solder heat resistance, and electroless plating resistance.

Specific examples of the multifunctional oxetane resin include multifunctional oxetane compounds such as bis([3-methyl-3-oxetanylmethoxy]methyl)ether, bis([3-ethyl-3-oxetanylmethoxy]methyl)ether, 1,4-bis([3 ethyl-3-oxetanyl-methoxy]methyl)benzene, 1,4-bis([3-ethyl-3-oxetanylmethoxy]methyl)benzene, (3-methyl-3-oxetanyl) methyl acrylate, (3-ethyl-3-oxetanyl)methylacrylate, (3-methyl-oxetanyl)methylmethacrylate, (3-ethyl-3-oxetanyl)methylmethacrylate, and their oligomers or copolymers, and besides the foregoing compounds, an etherification product of an oxetane alcohol with a resin having a hydroxyl group such as novolac resin, poly(p-hydroxystyrene), a cardo-type bisphenol compound, a calixarene compound, a calixresorcine arene compound, or silsesquioxane can be used.

Other examples include a copolymer of an unsaturated monomer having an oxetane, ring and an alkyl(meth)acrylate.

Examples of the compound having two or more cyclic thioether groups in the molecule include YL 7000, a bisphenol A type of episulfide resin commercially available from Japan Epoxy Resin Co, Ltd.

Moreover, one can use an episulfide resin wherein the oxygen atom of the epoxy group of the novolac epoxy resin is replaced with a sulfur atom.

The antimicrobial polymer coating composition may include 10 to 1000 parts by weight of the thermosetting resin relative to 100 parts by weight of the polyhedral oligomeric silsesquioxane having a cage structure, in which one or more reactive functional groups are substituted.

As described above, when the antimicrobial polymer coating composition is irradiated with light in a visible ray region after curing, the photosensitizer may be excited to generate active oxygen or the like. For this purpose, the antimicrobial polymer coating composition may contain a photosensitizer in a predetermined amount.

Specifically, the antimicrobial polymer coating composition may include 0.001 to 5 parts by weight of the photosensitizer relative to 100 parts by weight of the polyhedral oligomeric silsesquioxane having a cage structure, in which one or more reactive functional groups are substituted.

Meanwhile, as the photosensitizer, a commonly known compound may be used. For example, porphine compounds, porphyrin compounds, chlorin compounds, bacteriochlorin compounds, phthalocyanine compounds, naphthalocyanine compounds, 5-aminoevuline esters, or combinations of two or more thereof may be used.

However, in order to achieve higher antimicrobial activity and antimicrobial activity-maintaining performance in the final product prepared from the antimicrobial polymer coating composition, it is preferable to use a porphine compound or a porphyrin compound. More preferably, as the photosensitizer, a porphine compound or a porphyrin compound in which 1 to 8 phenyl groups introduced with an alkoxy having 1 to 10 carbon atoms is introduced such as 5,10,15,20-tetrakis(4-methoxyphenyl)-porphine can be used.

The antimicrobial polymer coating composition may contain an initiator in a predetermined amount.

Specifically, the antimicrobial polymer coating composition may include 0.001 to 10 parts by weight of the initiator relative to MO parts by weight of the polyhedral oligomeric silsesquioxane having a cage structure, in which one or more reactive functional groups are substituted.

As the initiator, various known initiators can be used, and for example, a thermosetting initiator can be used.

As such a thermosetting initiator, a thermal radical initiator such as t-butylpoxy maleic acid, t-butyl hydroperoxide, 2,4-dichlorobenzoyl peroxide, 1,1-di(t-butylperoxy)-3, 3,5-trimethylcyclohexane, N-butyl-4,4'-di(t-butylperoxy) valerate, and the like, and various mixtures thereof, may be used. In addition, a cation initiator that functions by heat, for example, a cation-based or protonic acid catalyst such as triflate, a trifluoro boron ether complex compound, trifluoro boron, and the like, various onium salts such as an ammonium salt, a phosphonium salt, and a sulfonium salt, methyltriphenylphosphonium bromide, ethyltriphenylphosphonium bromide, phenyltriphenylphosphonium bromide, acetophenyl benzyl methylsulfonium fluoroboride, and the like may be used.

The antimicrobial polymer coating composition may further include an organic solvent or a surfactant.

The organic solvent may be added at the time of mixing the respective components contained in the antimicrobial polymer coating composition, or may be contained in the antimicrobial polymer coating composition while the respective components being added in a state of being dispersed in or mixed with the organic solvent.

For example, the antimicrobial polymer coating composition may include an organic solvent such that the total solid content concentration of the components contained therein is 1 wt % to 80 wt %, or 2 to 50 wt %.

Non-limiting examples of the organic solvent include ketones, alcohols, acetates, and ethers, or mixtures of two or more thereof.

Specific examples of the organic solvent include ketones such as methyl ethyl ketone, methyl isobutyl ketone, acetylacetone or isobutyl ketone; alcohols such as methanol, ethanol, n-propanol, i-propanol, n-butanol, i-butanol, and t-butanol; acetates such as ethyl acetate, i-propyl acetate, and polyethylene glycol monomethyl ether acetate; ethers such as tetrahydrofuran and propylene glycol monomethyl ether; or mixtures of two or more thereof.

The type of the surfactant is also not particularly limited, and an anionic surfactant, a cationic surfactant, an amphoteric surfactant, a nonionic surfactant, and the like can be used.

Meanwhile, according to another embodiment of the present invention, an antimicrobial polymer film comprising a cured product of the antimicrobial polymer coating composition may be provided.

As described above, the antimicrobial polymer film prepared by curing the antimicrobial polymer coating composition s easily applicable to various fields and is suitable for mass production, but can also realize high antimicrobial activity even when applying light in a visible light region, and particularly, the generated active oxygen remains for a long time compared to previously known antimicrobial materials, and thus can achieve high antimicrobial efficiency.

The antimicrobial polymer film can be obtained by coating the antimicrobial polymer coating composition onto a predetermined substrate and photo-curing the coated product.

The specific type and thickness of the substrate are not particularly limited, and substrates that are known to be used for the production of a conventional polymer film can be used without particular limitation.

A method and device commonly used for coating the antimicrobial polymer coating composition may be used without particular limitation, and for example, a bar coating method such as Meyer bar method, a gravure coating method, a 2-roll reverse coating method, a vacuum slot die coating method, and 2 roll coating method, etc. may be used.

The coating thickness of the antimicrobial polymer coating composition may be determined according to the use of the antimicrobial polymer film to be finally produced. For example, the antimicrobial polymer coating composition may be coated (applied) in a thickness of 1 μm to 1000 μm.

In the thermal curing step, curing can be performed at a temperature of 100 t or higher using a commonly known heat source.

In addition, in the step of thermally curing the antimicrobial polymer coating composition, nitrogen purging or the like may be carried out in order to apply nitrogen atmosphere conditions.

Meanwhile, according to another embodiment of the present invention, an antimicrobial polymer film can be provided, comprising: a substrate layer containing a polyhedral oligomeric silsesquioxane having a cage structure, in which one or more reactive functional groups are substituted; and a photosensitizer dispersed in the substrate layer, wherein the polymer film has oxygen permeability of 10 to 80 cc/m$^2$ day.

The antimicrobial polymer film containing a polyhedral oligomeric silsesquioxane having a cage structure, in which one or more reactive functional groups are substituted, may have a predetermined polymer structure formed therein, and particularly it may provide an internal space in which the photosensitizer can remain for a long time.

Further, the antimicrobial polymer film may have oxygen permeability of a specific air permeability, for example, oxygen permeability of 10 to 80 cc/m2 day, 20 to 70 cc/cc/m2 day, or 25 to 60 cc/cc/m2 day.

When light in a visible light region is irradiated to such an antimicrobial polymer film, active oxygen species or free radicals are generated from the photosensitizer contained therein. As described above, the active oxygen derived from the photosensitizer can be maintained for a longer period of time in the space formed by the polyhedral oligomeric silsesquioxane having a cage structure, in which one or more reactive functional groups are substituted. In addition, as the antimicrobial polymer film has oxygen permeability in the above-described range, the active oxygen can be generated more efficiently, and also the time for which the active oxygen remains can be greatly increased.

More specifically, the antimicrobial polymer film may have a singlet oxygen lifetime of 0.1 ms or more, 0.8 ms or more, or 0.10 Ins to 1.20 ms, as measured through a time-resolved phosphorescence laser spectroscopy system (see FIG. 2).

The antimicrobial polymer film may have a thickness of 10 μm to 10,000 μm.

The substrate layer may further include a thermosetting resin.

Meanwhile, according to another embodiment of the present invention, an electronic product including the above-mentioned antimicrobial polymer film can be provided.

Examples of the electronic product are not particularly limited, and for example, it can be applied to products where harmful bacteria, fungi etc. grow easily, such as a humidifier, a water tank, a refrigerator, an air washer, an aquarium, and an air cleaner.

In order to produce active oxygen or radicals in the antimicrobial polymer film, the electronic product may include a light irradiation device.

In addition, the electronic product may further include a device for distributing the produced active oxygen or radicals, for example, an air circulation device.

Advantageous Effects

According to the present invention, an antimicrobial coating composition which can maintain high antimicrobial activity for a long period of time even by using light in a visible light region, and can provide an antimicrobial material suitable for a mass production process, and an antimicrobial coating film which can maintain high antimicrobial activity for a long period of time even by using light in a visible light region, can be provided.

BRIEF DESCRIPTION OF THE DRAWINGS

FIG. 1 shows MALDI-TOF mass spectrometry data of the polyhedral oligomeric silsesquioxane having a cage structure prepared in Preparation Example 1.

FIG. 2 schematically shows the method for measuring the production amount and lifetime of singlet oxygen in Experimental Example 2.

FIG. 3 schematically shows a method for measuring the antimicrobial activity of the polymer films of examples and comparative examples according to JIS R 1702 (KS L ISO 27447) in Experimental Example 3.

FIG. 4 is a graph showing the production amount and lifetime of singlet oxygen of Examples 1 and 2.

DETAILED DESCRIPTION OF THE EMBODIMENTS

Embodiments of the present invention are described in more detail by way of the examples provided below.

However, the following examples are given for illustrative purposes only, and the scope of the present invention is not intended to be limited to or by these examples.

PREPARATION EXAMPLE: PREPARATION OF POLYHEDRAL OLIGOMERIC SILSESQUIOXANE HAVING A CAGE STRUCTURE, IN WHICH DIALKYLSILANE EPOXIDE FUNCTIONAL GROUP IS INTRODUCED

Preparation Example 1

10 g of tetramethylammonium hydroxide pentahydrate (TMAH) was dissolved in a small amount of MeOH at room temperature, and then 10 g of TEOS was added to the solution and mixed with 5 g of distilled water.

Then, methanol was added to the solution and allowed to react for about 40 hours.

Subsequently, 10 g of the formed OctaTMA-CS was dissolved in an alcohol, to which about 10 g of vinyldimethylchlorosilane and a small amount of DMF was added, and the mixture was stirred at room temperature for 1 day.

Whether or not the resulting reactant was in conformity with an octavinyl dimethyl-CS(OVDM-CS) structure was analyzed by MALDI-TOF and 1H NMR as in FIG. 1.

Then, 10 g of the obtained OVDM-CS was dissolved in a small amount of dichloromethane (DCM), and meta-chloroperoxybenzoic acid (m-CPBA) was mixed while dripping and stirring until a precipitate was formed.

Then, 100 g of 10% aqueous sodium sulfite was added and washed to inactivate the m-CPBA.

Then, after separating the DCM layer, a small amount of 5% aqueous sodium bicarbonate was added to remove the by-product benzoic acid. Thereby, OODMS-CS-1 [polyhedral oligomeric silsesquioxane having a cage structure in which a dimethylsilane epoxide functional group is bonded via oxygen] was obtained.

The preparation example is summarized as shown in the following General Formula 1.

[General Formula 1]

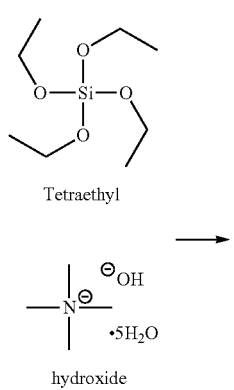

Tetraethyl hydroxide

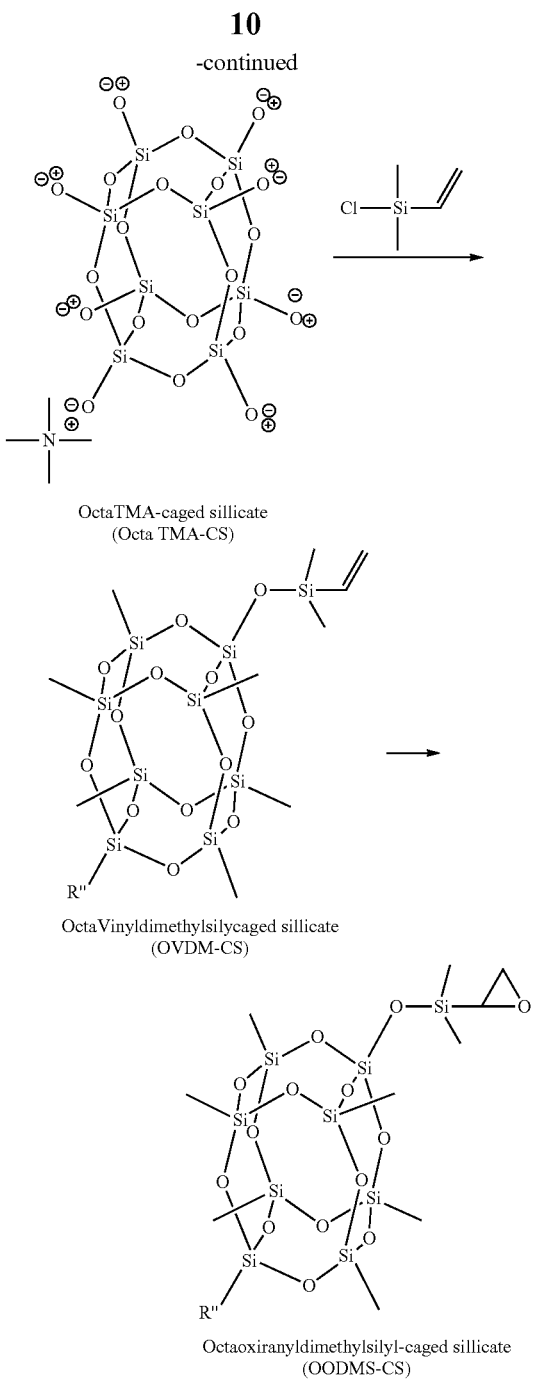

OctaTMA-caged sillicate
(Octa TMA-CS)

OctaVinyldimethylsilycaged sillicate
(OVDM-CS)

Octaoxiranyldimethylsilyl-caged sillicate
(OODMS-CS)

Preparation Example 2

OODMS-CS-2 [polyhedral oligomeric silsesquioxane having a cage structure in which a dimethylsilane epoxide functional group is bonded via oxygen] was obtained in the same manner as in Preparation Example 1, except that the amount of vinyldimethylchlorosilane was changed to 50 g.

Preparation Example 3

OODMS-CS-3 [polyhedral oligomeric silsesquioxane having a cage structure in which a dimethylsilane epoxide functional group is bonded via oxygen] was obtained in the same manner as in Preparation Example 1, except that the amount of vinyldimethylchlorosilane was changed to 100 g.

Example: Preparation of Antimicrobial Polymer Coating Composition and Antimicrobial Polymer Film Example 1

10 g of OODMS-CS-1 synthesized in Preparation Example 1, 0.02 g of a thermal initiator (trade name S1-B3A, Sanshin Chemical), 0.05 g of 5,10,15,20-tetrakis (4-methoxyphenyl)-porphine (CAS No. 22112-78-3) as a photosensitizer, and 10 g of propylene glycol monomethyl ether acetate (PGMEA) were mixed to prepare an antimicrobial polymer coating solution having a solid content concentration of 50 wt %.

Then, the coating solution was coated using a #20 bar, and then thermally cured in an oven at 120° C. for 20 minutes to prepare an antimicrobial polymer film having a thickness of 20 μm.

Example 2

An antimicrobial polymer coating solution (solid content concentration of 50%) and an antimicrobial polymer film (20 μm thick) were prepared in the same manner as in Example 1, except that 10 g of OODMS-CS-2 synthesized in Preparation Example 2 was used.

Example 3

An antimicrobial polymer coating solution (solid content concentration of 50%) and an antimicrobial polymer film (20 μm thick) were prepared in the same manner as in Example 1, except that OODMS-CS-3 synthesized in Preparation Example 3 was used.

COMPARATIVE EXAMPLE

Comparative Example 1

10 g of epoxy silicone oil (bifunctional epoxy, trade name: X-22-163C, Shin-Etsu), 0.02 g of a thermal initiator (trade name S1-B3A, Sanshin Chemical), 0.05 g of 5,10,15,20-tetrakis(4-methoxyphenyl)-porphine (CAS No. 22112-78-3) as a photosensitizer, and 10 g of propylene glycol monomethyl ether acetate (PGMEA) were mixed to prepare a polymer coating solution having a solid content concentration of 50 wt %.

Then, the coating solution was coated using a #20 bar, and then thermally cured in an oven at 120° C. for 20 minutes to prepare an antimicrobial polymer film having a thickness of 20 μm.

Comparative Example 2

10 g of an epoxy resin (trifunctional epoxy, trade name YH-300, Kukdo Chemical), 0.02 g of a thermal initiator (trade name S1-B3A, Sanshin Chemical), 0.05 g of 5,10,15, 20-tetrakis(4-methoxyphenyl)-porphine (CAS No. 22112-78-3) as a photosensitizer, and 10 g of propylene glycol monomethyl ether acetate (PGMEA) were mixed to prepare a polymer coating solution having a solid content concentration of 50 wt %.

Then, the coating solution was coated using a #20 bar, and then thermally cured in an oven at 120° C. for 20 minutes to prepare an antimicrobial polymer film having a thickness of 20 μm.

EXPERIMENTAL EXAMPLE

Experimental Example 1: Measurement of Oxygen Permeability of Polymer Films of Examples and Comparative Examples The oxygen permeability of the polymer films of the examples and comparative examples were measured at 25° C. under a 60 RH % atmosphere using an Oxygen Permeation Analyzer (Model 8000, Illinois Instruments product) according to ASTM D 3895.

Experimental Example 2: Measurement of transmittance and haze of polymer films of examples and comparative examples The transmittance and haze, which the polymer films obtained in the examples and comparative examples, shown in a visible light region (380 to 780 nm), were measured using a spectrophotometer COH-400 instrument.

Experimental Example 3: Measurement of Pencil Hardness of Polymer Films of Examples and Comparative Examples The pencil hardness of the polymer films obtained in the examples and comparative examples was measured using a pencil hardness tester according to standard JIS K5400.

The pencil hardness meter was reciprocated three times on the coating layer at an angle of 45 degrees under a load of 0.5 kg to determine the hardness at which no scratches were observed.

The pencil to be measured was reciprocated three times at an angle of 45 degrees under a load of 0.5 kg to determine the maximum hardness at which no scratches were observed.

Experimental Example 5: Measurement of the Production Amount and Lifetime of Singlet Oxygen of the Polymer Films of Examples and Comparative Examples The production amount and lifetime of singlet oxygen of the polymer films of the examples and comparative examples were measured using a time-resolved phosphorescent laser spectroscopy system shown schematically in FIG. 2.

Specifically, $^1O_2$ (singlet oxygen) exhibits photoluminescence at 1275 nm. Accordingly, the presence/absence of production of $^1O_2$ and the relative amount were measured by using a near infrared photomultiplier tube (NIR-PMT) in a wavelength range of 900 nm to 1400 nm, and the movement of $^1O_2$ was observed through a time-resolved spectrum.

In the case of NIR-PMT, a photoluminescence value in the wavelength region of 900 to 1400 nm could be obtained. Since singlet oxygen exhibited light emission at 1275 nm, in order to optionally detect light emission at 1275 nm, only the light emission (PL) value detected at 1275 nm was obtained by mounting an M/C (monochromator) in front of PMT.

The measurement results are shown in FIG. 4.

It was confirmed that the graph area of FIG. 4 is the amount of $^1O_2$ produced, and the x-axis has a lifetime (time) of about 150 is in the case of Example 2 and about 1000 is in the case of Example 2.

Experimental Example 6: Measurement of Antimicrobial Activity of Polymer Films of Examples and Comparative Examples The antimicrobial activities of the polymer films of the examples and comparative examples were measured by the method shown schematically in FIG. 3 according to JIS R 1702.

TABLE 1

| | Substitution rate of silicon in polyhedral oligomeric silsesquioxane | Oxygen transmittance/ haze | Oxygen permeability (cc/m$^2$day) | Singlet oxygen ($^1O_2$) Production amount (relative value) | Lifetime (µs) | Antimicrobial activity | Pencil hardness (load of 500 g) |
|---|---|---|---|---|---|---|---|
| Example 1 | about 6.25% | 91.1/0.3 | 31.5 | 2.1 | about 150 | 92.3% | 3H |
| Example 2 | about 31.25% | 89.5/3.3 | 30.7 | 2.4 | about 1000 | >99% | 5H |
| Comparative Example 1 | — | 90.7/8.3 | 95 | 1 (reference value) | 23 | <50% | F~H |
| Comparative Example 2 | — | 90.3/0.7 | 8.3 | — | — | — | 2H |

As can be seen in Table 1 above, it was confirmed that the polymer films prepared using the antimicrobial polymer coating composition including a polyhedral oligomeric silsesquioxane having a cage structure, in which one or more reactive functional groups were substituted, showed a 2-times higher production amount of singlet oxygen as compared with the polymer film of Comparative Example 1, and particularly, the singlet oxygen lifetime was increased by about 6.5 times or about 43 times, and that the polymer films of Examples 1 and 2 had a high antimicrobial property and greatly improved surface hardness.

Particularly, when the substitution rate of the silicon atom in the polyhedral oligomeric silsesquioxane were 20 to 40%, the lifetime of the singlet oxygen increased to 1 ms, and the antimicrobial activity was shown as 99% or more. In addition, the pencil hardness (load of 500 g) was a 5H level due to a cage of a 2 nm size, which was a level that could also be used as a hard coating material.

On the other hand, it was confirmed that in the case of the polymer films prepared in Comparative Examples 1 and 2, not only was the production amount of singlet oxygen small as compared with Examples 1 and 2, but also the singlet oxygen lifetime was extremely short.

In addition, it was confirmed that sufficient antimicrobial activities of the polymer films of Comparative Examples 1 and 2 were not secured, and the surface hardness also remained at a relatively low level.

The invention claimed is:

1. An antimicrobial polymer coating composition comprising: a polyhedral oligomeric silsesquioxane having a cage structure and a photosensitizer, wherein the polyhedral oligomeric silsesquioxane contains at least one reactive functional group substituted on silicon atoms,
   wherein 4% to 60% of the silicon atoms of the polyhedral oligomeric silsesquioxane having the cage structure are substituted with the reactive functional group, and
   wherein the photosensitizer includes at least one selected from the group of porphine compounds, porphyrin compounds, chlorin compounds, bacteriochlorin compounds, phthalocyanine compounds, naphthalocyanine compounds, and 5-aminoevuline esters.

2. The antimicrobial polymer coating composition of claim 1, wherein the reactive functional group includes at least one selected from the group of a (meth)acrylate, an alkyl(meth)acrylate having 1 to 20 carbon atoms, a cycloalkyl epoxide having 3 to 20 carbon atoms, an alkyl cycloalkane epoxide having 1 to 10 carbon atoms, and a dialkylsilane epoxide.

3. The antimicrobial polymer coating composition of claim 1, further comprising a thermosetting resin containing at least one thermosetting functional group selected from the group of an epoxy group, an oxetanyl group, a cyclic ether group, and a cyclic thioether group.

4. The antimicrobial polymer coating composition of claim 3, comprising 10 to 1000 parts by weight of the thermosetting resin relative to 100 parts by weight of the polyhedral oligomeric silsesquioxane having a cage structure.

5. The antimicrobial polymer coating composition of claim 1, comprising 0.001 to 5 pails by weight of the photosensitizer relative to 100 parts by weight of the polyhedral oligomeric silsesquioxane having a cage structure.

6. The antimicrobial polymer coating composition of claim 1, wherein the photosensitizer includes a porphine compound or a porphyrin compound in which 1 to 8 phenyl groups introduced with an alkoxy having 1 to 10 carbon atoms are introduced.

7. An antimicrobial polymer film comprising a cured product of the antimicrobial polymer coating composition of claim 1.

8. An electronic product comprising the antimicrobial polymer film of claim 7.

9. The electronic product of claim 8, wherein the electronic product is a humidifier, a refrigerator, an air washer, or an aquarium.

10. An antimicrobial polymer film comprising: a substrate layer containing a polyhedral oligomeric silsesquioxane having a cage structure and having one or more reactive functional groups substituted on silicon atoms; and a photosensitizer dispersed in the substrate layer,
   wherein the film has oxygen permeability of 10 to 80 cc/m$^2$day.

11. The antimicrobial polymer film of claim 10, wherein the film has a thickness of 10 µm to 10,000 µm.

12. The antimicrobial polymer film of claim 10, wherein the film has a singlet oxygen lifetime of 0.001 seconds or more, as measured in the wavelength region of 900 non to 1400 nm using a time-resolved phosphorescence laser spectroscopy system.

13. The antimicrobial polymer film of claim 10, wherein the substrate layer further includes a thermosetting resin.

14. An electronic product comprising the antimicrobial polymer film of claim 10.

* * * * *